United States Patent Office 2,947,343
Patented Aug. 2, 1960

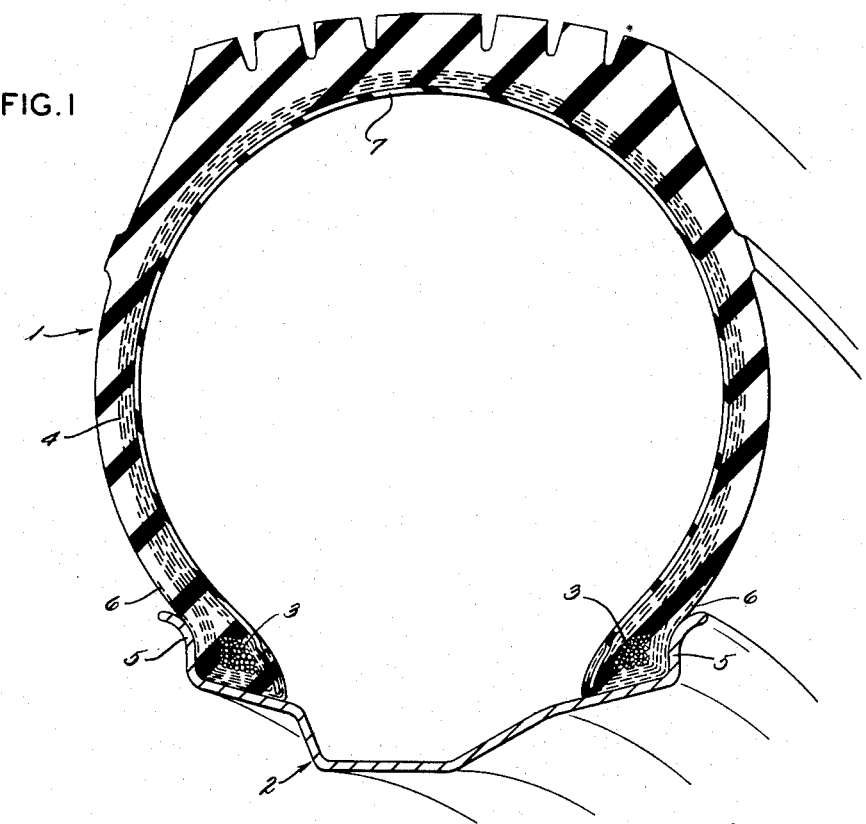
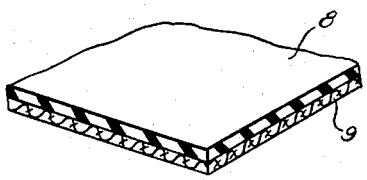
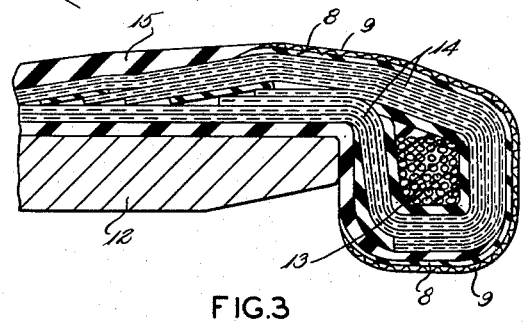
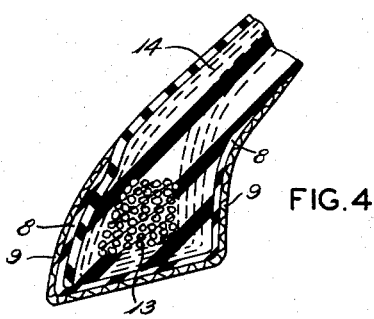
INVENTOR.
IRVIN J. SJOTHUN

2,947,343

CHAFER FOR TUBELESS TIRES

Irvin J. Sjothun, Akron, Ohio, assignor to The Firestone Tire & Rubber Company, Akron, Ohio, a corporation of Ohio Filed Sept. 18, 1957, Ser. No. 684,761

8 Claims. (Cl. 152—362)

This invention relates to the bead of a pneumatic tire and more particularly to a bead chafer and a novel method for preparing the chafer to protect the tire bead from the abrasive action of the wheel rim on which the tire is mounted. The invention is also designed to prevent the escape of air from the tire air cavity through the bead into the body portion of the tire.

A pneumatic tire relies for stability on two circular rubberized wire bundles anchored in each edge of the rubber insulated fabric sheets of the tire body to form the bead portion which is adapted for mounting the tire on the wheel. Conventional practice had been to turn the marginal edges of alternate pairs rubberized fabric plies of the tire around each of the rubberized wire bundles to secure these bundles to the respective edges of the tire and in some instances to cover the rubberized ply fabric of the bead with a rubberized fabric protecting strip called a chafer. However, with the advent of tubeless tires, where the inflationary air supporting the tire load bears directly against the inner surface of the tire and therefore directly on the bead wall surface, air seeps around the edges of the bead and up between the bead and the rim to escape into the atmosphere. This action is damaging to the tire because, during rotation of the wheel, rubber is worn off the base or side of the bead surface next to the rim to expose the fabric of the chafer or of the tire plies in which case the air will enter and wick along the fabric cords into remote portions of the body of the tire to cause oxidation of the rubber and tire failure. A thick coat of rubber over the outer surface of the bead to protect the fabric from the rim prevents this undesirable result. The use of nylon and rayon monofilament as a fabric chafer has been suggested to avoid the problems of the prior art but these filaments undesirably pull away from the vulcanized rubber in which they are imbedded to leave tunnels which accommodate passage of air into the tire body. Moreover, it is difficult to keep a thickness of rubber on the outer face of the base and sides of the bead during molding and vulcanization of the tire because the pressures and temperatures of vulcanization squeeze most of the rubber away from the bead surface to expose the cords of the plies or chafer.

The present invention overcomes the disadvantages of prior bead constructions by providing a tire bead made of a combination of a sheet of nylon monofilament adhered on one side to a sheet of vulcanizable rubber and cured as a unitary strip before being assembled in the tire. The pre-cured rubber-fabric sandwich thus formed is adhered to the bead of a tire and subjected to a second cure when the tire is molded and vulcanized.

It is, therefore, an object of this invention to provide means for protecting the bead portion of a pneumatic tire from the chafing action of the rim on which the tire is mounted. It is also an object of this invention to provide a tire bead protected by a chafer element comprised of a fabric strip adhered to a sheet of vulcanized rubbery material before incorporation in the tire. Another object of this invention is to provide means for protecting the bead of a tire from the encroachment of air from the tire cavity. Yet a further object of the invention is to provide a chafer element for the bead of a tubeless tire comprising a nylon monofilament sheet unitarily adhered to a rubbery strip, both the sheet and strip being vulcanized together before assembly with and vulcanization of the other elements of the tire. Yet another object of the invention is to provide a bead assembly for a tubeless tire which is airproof in the event the textile filaments of the chafer are pulled away from the adjacent rubber coating to form tunnels during operation of the tire.

These and other objects of the invention will be more readily understood by reference to the specification and drawings of which:

Figure 1 is a sectional view in perspective of a conventional tubeless tire.

Figure 2 is a fragmentary perspective view of an element of the invention before incorporation in a tire.

Figure 3 is a sectional view of a bead of the tire of the invention before vulcanization.

Figure 4 is a fragmentary sectional view of a tire bead incorporating the invention.

Referring to Fig. 1, a tubeless tire generally indicated at 1 is mounted on a drop center rim 2. Each tire bead 3—3 is of metal wire hoop construction held to the tire by the lapping of the fabric plies 4 and protected from the rubbing of rim flanges 5 by chafer strip 6. The inner belly or wall of the tire is covered with a substantially air impervious innerliner 7 which extends from bead to bead. Abrasion of the bead surfaces occurs during the rotation of the wheel, wherein slight slip, play and wobble between the tire beads and the rim 2 causes the hard metal flanges 5—5 of the rim to rub against the surfaces of the respective beads of the tire. As abrasion takes place, the rubbery coat protecting the fabric 6 used in the chafer of the tire is rubbed off and the fabric exposed. Air, seeping between the bead and the rim, works its way into the fabric of chafer 6 and since that fabric is near to the plies 4 of the tire, the air will follow the cords of those plies into remote portions of the tire to cause ply or tread separation. Also, cords or filaments of chafer elements previously used in this location would pull away from the rubber in which they were imbedded to form continuous channels or tunnels along which air would travel.

A tubeless tire was constructed, in view of the invention, by plying up thicknesses of rubber and rubberized fabric on tire building drum 12 (Fig. 3), with inextensible metallic hoops 13 anchored to the edges of the tire casing by the lapping of rubberized fabric members 14. In the preferred form of the invention nylon monofilament fabric may be rubberized either by dipping in a rubbery solution or passing through a calender to squeeze rubber into and around the filaments of the fabric. The nylon monofilament fabric 9 was then adhered to a second relatively heavy strip of unvulcanized vulcanizable rubber 8 (Fig. 2) and vulcanized at a temperature of from 212° F. to 325° F. in a suitable oven. The vulcanized sheet was removed from the oven and cut into strips about 3 inches wide for use as the chafer portion of the tire. These strips were brought to the building drum 12, and after the fabric ply members 14 were turned up around the bead, the rubber-fabric sandwich strip 8—9 was applied to the bead of the tire. The rubbery tread and sidewall portion 15 was superimposed upon the crown portion of the tire and tire removed from the tire building drum, shaped, and vulcanized. Pre-vulcanized rubber-fabric sandwich layer 8—9 which included the rubberized nylon monofilament strip was of a rigidity, because of pre-vulcanization, such that it would not deform and squeeze out of position when the tire was vulcanized in a closed mold with an internal heated fluid pressure against the inner wall surface of the tire of 300 lbs. per sq. in. and an external heat of 321° F. for 21 minutes.

The tire, shaped and vulcanized, was removed from the mold, allowed to cool and mounted on the rim of a wheel of an automobile. The tire had a bead construction as shown in Fig. 4. After continuous periods of road operation at conditions of high temperature and high overloading which normally result in failure of a conventional tubeless tire through entry of air into the body through the bead, the tire with the novel bead was intact and no air had entered the tire body through the chafer to cause failure. In those places where the rim flange had rubbed the rubber coat away from the monofilament, the air from the tire cavity had not been able to penetrate into the ply members. After the tire was cut into sections and the individual monofilaments examined, it was found that even though these filaments had separated from the surrounding rubber to form channels, such channels did not extend into the fabric plies around the bead to cause damaging leakage of air into the tire body.

An example of a rubbery material having suitable properties for the cushion element 8, used between the nylon strip and the other parts of the tire bead is as follows:

| | |
|---|---|
| Natural rubber | 100.00 |
| Carbon black | 55.00 |
| Zinc oxide | 3.50 |
| Stearic acid | 3.00 |
| Coumarone indene resin | 4.00 |
| Phenol-aldehyde resin | 10.00 |
| Zinc mercaptobenzothiazole | .50 |
| Zinc dimethyl dithiocarbamate | .25 |
| Dibutyl ammoniumoleate | .25 |
| Sulfur | 2.50 |
| | 179.00 |

A composition according to the foregoing formula was mixed on a conventional two-roll mill, sheeted out on a calender into sheets about .050" thick, and cut into strips about 3" wide. The strips were applied to strips of rubberized nylon monofilament material of the same width, and pre-cured for about 10 minutes in an atmosphere of circulating air at a temperature of 290° F. placed in the position of strip 8 in Fig. 3 in the construction of the tire and the tire vulcanized. The pre-cured strip merged with and was welded to the other elements of the tire bead, maintained its original thickness during the vulcanization and served as a resilient protecting member for the bead when the tire was operated on a vehicle wheel.

As an alternate form of the invention the monofilament sheet may be passed through a calender in such a manner that a heavier thickness of vulcanizable rubber stock may be deposited on one side than on the other. In this form of the invention the "off balance" strip may be pre-vulcanized and applied to the bead of the tire in a manner aforedescribed with the heavier or "off balance" side of the calendered sheet adhered to the bead of the tire.

While the invention has been described by reference to a preferred form, it is not to be limited to such but only to the scope of the following claims.

What is claimed is:

1. A tubeless tire comprised of an open-bellied vulcanized rubberized fabric body portion terminating at its edges in two inextensible hoop-shaped beads, said body portion having superimposed thereon a vulcanized rubbery tread portion, a substantially air impervious vulcanized rubbery liner adhered to the belly of said tire from bead to bead, said inextensible bead portions covered over at least part of the radially inner and axially outer portions thereof by a layer of rubberized monofilament material and a layer of a vulcanized rubbery material interposed between said monofilament sheet and the other portions of said bead, the rubbery portions of said layers comprised of vulcanized rubbery polymers stiffened to a substantially non-flowable state by a first vulcanization before application to the bead of the unvulcanized tire and vulcanized a second time as said tire is molded and vulcanized.

2. A tubeless tire comprised of an open bellied vulcanized rubberized fabric body portion terminating at its edges in two inextensible hoop-shaped beads, said body portion having superimposed thereon a vulcanized rubbery tread portion, a substantially air impervious vulcanized rubbery liner adhered to the belly of said tire from bead to bead, said inextensible bead portions covered over at least part of the radially inner and axially outer portions thereof by a layer of rubberized nylon monofilament and a layer of a vulcanized rubbery material interposed between said monofilament sheet and the other portions of said bead, the rubbery portions of said layers comprised of vulcanized rubbery polymers stiffened to a substantially nonflowable state by a first vulcanization before application to the bead of the unvulcanized tire and vulcanized a second time as said tire is molded and vulcanized.

3. A tubeless tire comprised of an open-bellied vulcanized rubberized fabric body portion terminating at its edges in two inextensible hoop-shaped beads, said body portion having superimposed thereon a vulcanized rubbery tread portion, a substantially air impervious vulcanized rubbery liner adhered to the belly of said tire from bead to bead, said inextensible bead portions covered over at least part of the radially inner and axially outer portions thereof by a layer of rubberized monofilament material having a thicker layer of a vulcanized rubbery material on the axially inner side of said sheet than on the axially outer side of said bead, the rubbery portions of said rubberized material comprised of a vulcanized rubbery polymer stiffened to a substantially non-flowable state by a first vulcanization before application to the bead of the unvulcanized tire and vulcanized a second time as said tire is molded and vulcanized.

4. A tubeless tire comprised of an open-bellied vulcanized rubberized fabric body portion terminating at its edges in two inextensible hoop-shaped beads, said body portion having superimposed thereon a vulcanized rubbery tread portion, a substantially air impervious vulcanized rubbery liner adhered to the belly of said tire from bead to bead, said inextensible bead portions covered over at least part of the radially inner and axially outer portions thereof by a layer of rubberized nylon monofilament material having a thicker layer of a vulcanized rubbery material on the axially inner side of said sheet than on the axially outer side of said bead, the rubbery portions of said rubberized material comprised of a vulcanized rubbery polymer stiffened to a substantially non-flowable state by a first vulcanization before application to the bead of the unvulcanized tire and vulcanized a second time as said tire is molded and vulcanized.

5. A method of manufacturing the bead portion of a pneumatic tubeless tire comprising rubberizing a sheet of monofilament material, forming a second sheet of vulcanizable rubbery material, adhering said sheets in face-to-face relation, cutting said sheets into strips, vulcanizing said strips to a substantially non-fluid condition at the temperature of vulcanization, adhering said strips across the radially inner and axially outer surfaces of a tubeless tire bead before the tire is vulcanized and vulcanizing said tire to give said rubberized fabric strip and said rubbery layer a second vulcanization whereby said layer maintains a substantially uniform thickness throughout the operation.

6. A method of manufacturing the bead portion of a pneumatic tubeless tire comprising rubberizing a sheet of monofilament material, forming a second sheet of vulcanizable rubbery material, adhering said sheets in face-to-face relation, vulcanizing said strips to a substantially non-fluid condition at the temperature of vulcanization, cutting said sheets into strips, adhering said strips across the radially inner and axially outer surfaces of a tubeless tire bead before the tire is vulcanized and vulcanizing said tire to give said rubberized fabric strip and said rubbery layer a second vulcanization whereby said layer maintains a substantially uniform thickness throughout the operation.

7. A method of manufacturing the bead portion of a pneumatic tubeless tire comprising rubberizing a sheet of textile material, forming a second sheet of vulcanizable rubbery material, adhering said sheets in face-to-face relation, cutting said sheets into strips, vulcanizing said strips to a substantially non-fluid condition at the temperature of vulcanization, adhering said strips across the radially inner and axially outer surfaces of a tubeless tire bead before the tire is vulcanized and vulcanizing said tire to give said rubberized fabric strip and said rubbery layer a second vulcanization whereby said layer maintains a substantially uniform thickness throughout the operation.

8. A method of manufacturing the bead portion of a pneumatic tubeless tire comprising rubberizing a sheet of textile material, forming a second sheet of vulcanizable rubbery material, adhering said sheets in face-to-face relation, vulcanizing said strips to a substantially non-fluid condition at the temperature of vulcanization, cutting said sheets into strips, adhering said strips across the radially inner and axially outer surfaces of a tubeless tire bead before the tire is vulcanized and vulcanizing said tire to give said rubberized fabric strip and said rubbery layer a second vulcanization whereby said layer maintains a substantially uniform thickness throughout the operation.

References Cited in the file of this patent

UNITED STATES PATENTS

| | | |
|---|---|---|
| 1,553,883 | Theis | Sept. 15, 1925 |
| 2,625,980 | Castricum | Jan. 20, 1953 |
| 2,625,981 | Wallace | Jan. 20, 1953 |
| 2,638,955 | Gruber | May 19, 1953 |
| 2,803,283 | Gruber | Aug. 20, 1957 |
| 2,820,500 | Dickerson | Jan. 21, 1958 |
| 2,822,019 | Koch et al. | Feb. 4, 1958 |
| 2,822,026 | Willis | Feb. 4, 1958 |

FOREIGN PATENTS

| | | |
|---|---|---|
| 1,084,382 | France | July 7, 1954 |